US007685391B1

(12) United States Patent
Cholleti et al.

(10) Patent No.: US 7,685,391 B1
(45) Date of Patent: Mar. 23, 2010

(54) KERNEL/USER STACK RELOCATION DURING SYSTEM UPTIME

(75) Inventors: Udayakumar Cholleti, Cupertino, CA (US); Viswanath Knishnamurthy, Sunnyvale, CA (US); Stan J. Studzinski, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1428 days.

(21) Appl. No.: 10/963,966

(22) Filed: Oct. 12, 2004

(51) Int. Cl.
*G06F 13/14* (2006.01)
(52) U.S. Cl. .................. 711/165; 711/152; 711/163
(58) Field of Classification Search .............. 711/152, 711/163, 165
See application file for complete search history.

(56) References Cited

U.S. PATENT DOCUMENTS

| | | | | |
|---|---|---|---|---|
| 6,553,477 B1* | 4/2003 | Krishna et al. | ............. | 711/207 |
| 6,732,138 B1* | 5/2004 | Browning et al. | ........... | 718/102 |
| 6,971,091 B1* | 11/2005 | Arnold et al. | ............... | 717/145 |
| 2003/0120856 A1* | 6/2003 | Neiger et al. | ................. | 711/6 |
| 2003/0191881 A1* | 10/2003 | Arndt et al. | ................. | 710/240 |
| 2004/0193819 A1* | 9/2004 | Marinescu et al. | .......... | 711/165 |
| 2004/0215840 A1* | 10/2004 | Shimura | ....................... | 710/1 |

OTHER PUBLICATIONS

Nikolopoulos et al., User-Level Dynamic Page Migration for Multiprogrammed Shared-Memory Multiprocessors, 2000, IEEE, pp. 95-103.*
Baase, Sarah, "Computer Algorithms: Introduction to Design and Analysis", 1978, Addison-Wesley, p. 8, ISBN: 0-201-00327-9.*
"Priority Interrupt Controller", Aug. 19, 2002, http://ecee.colorado.edu/~ecen2120/Manual/pic/8259a.html.*

* cited by examiner

*Primary Examiner*—Sanjiv Shah
*Assistant Examiner*—Shawn Eland
(74) *Attorney, Agent, or Firm*—Marsh Fischmann & Breyfogle LLP; Jonathon A. Szumny; Kent A. Lembke (57) ABSTRACT

Kernel and user stack data is stored in relocatable memory. A kernel thread or a user thread can move its own stack data by creating a relocation request and adding the relocation request to a queue of a dedicated thread. The dedicated thread performs the relocation on behalf of the requesting kernel or user thread.

20 Claims, 5 Drawing Sheets

KERNEL/USER STACK RELOCATION DURING SYSTEM UPTIME

CROSS REFERENCE TO RELATED APPLICATIONS

This application is related to commonly assigned U.S. patent application Ser. No. 10/798,742, filed on Mar. 10, 2004 and entitled, "System Memory Relocation During System Uptime," which is hereby incorporated by reference in its entirety.

BACKGROUND

Computer processors rely on stacks in memory to execute machine code. A stack is a memory structure stored in volatile computer memory, such as RAM. In a multithreading system having one or more processors, each concurrently running thread is assigned its own stack space.

Relocation of data from one physical memory location to another is sometimes necessary. For example, if one memory board begins to fail, it might be desirable to replace it. However, when the memory board that fails contains stacks, or other data traditionally considered "non-relocatable" (NR), special measures must be taken. Often, the system is simply shut down, the memory board swapped out and the system restarted. This is undesirable for obvious reasons, least of which is the down-time of the system.

Kernel/user stacks could also be relocated using a hardware based copy-rename algorithm. In this case, all devices attached to the system are suspended, all CPUs are paused, the entire memory is copied from the old source board to the new destination board, and the physical addresses on the new board are reprogrammed to be the same as those on the old board which is to be removed. The old board is deactivated and the system resumed.

Hardware copy-rename has severe limitations. First, since it pauses all the remaining CPUs and suspends all devices, system performance is drastically affected. Thus, it is only used while removing the board on which operating system (OS) kernel memory is placed. Second, copy-rename requires all the kernel memory including the kernel/user stacks to be allocated on the minimum number of boards. Otherwise, it may not be possible to reprogram the new board with the physical addresses of the old board.

Thus, previously, all kernel/user stacks were allocated on the minimum number of boards, resulting in threads running on all CPUs to access the same memory board whenever each thread accesses its stack. This increases memory latency and bus traffic whenever a thread accesses its stack and thus affects the scalability of large servers.

SUMMARY

Embodiments of the present invention provide a method and software safely allowing kernel and user stacks to be relocatable and relocated without suspending or shutting down the system.

It should be appreciated that the present invention can be implemented in numerous ways, including as a process, an apparatus, a system, a device, or a method. Several inventive embodiments of the present invention are described below.

In one embodiment, a kernel and user stack data is stored in relocatable memory and is relocated from one location in physical memory to another by creating a relocation request to move the data and adding the relocation request to a queue of a dedicated thread.

In another embodiment, the relocation thread relocates data stored in a source page in physical memory to a destination page by first assessing whether the source page contains stack data of the relocation thread and performing system memory relocation when the source page does not contain stack data of the relocation thread.

In yet another embodiment, a computer operating system includes instructions encoded on machine readable media providing a system call for a relocation thread for relocating data stored in a source page in physical memory to a destination page in physical memory. The system call determines whether the source page contains stack data of the relocation thread. If it does, the system call performs a system memory relocation algorithm. If not, the system call creates a relocation request and adds it to a queue of a dedicated thread when the source page contains the stack data. The dedicated thread performs the system memory relocation algorithm in response to the adding.

Other aspects of the present invention will become apparent from the following detailed description, taken in conjunction with the accompanying drawings, illustrating by way of example the principles of the invention.

DETAILED DESCRIPTION

Figure 1:
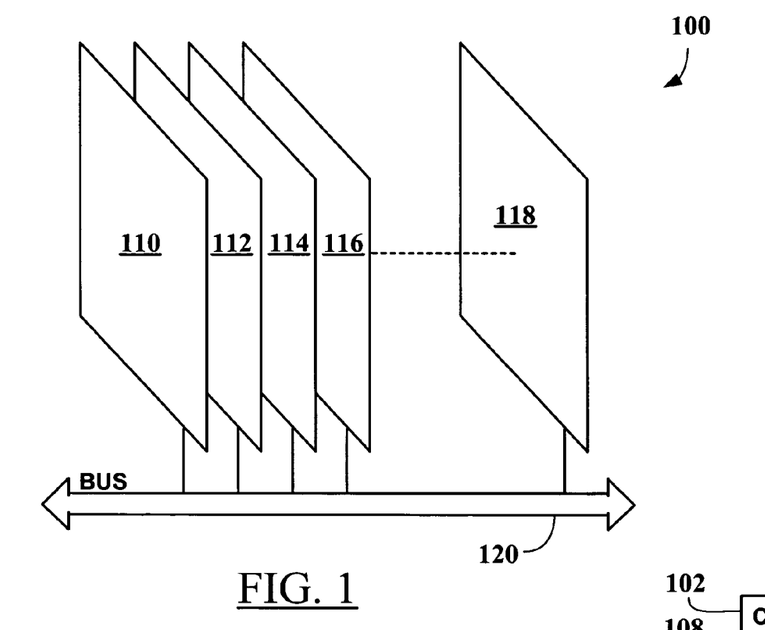
FIG. 1 shows an exemplary computer system on which the disclosed embodiments can be implemented.

Memory management is a key task of most computer operating systems (OS). In large server systems it is occasionally necessary to move data from one memory board to another, or from one physical location to another in a distributed network. FIG. 1 shows an exemplary computer system 100 having a plurality of circuit boards 110-118 in communication via bus 120. Circuit boards 110-118 may be located in one location, or may be distributed across a network. Each circuit board typically includes a CPU and physical memory, such as RAM stored in solid-state circuitry. Some circuit boards may have memory only and no CPU. It is also possible to have a CPU separate from memory.

Each memory location on each board is assigned an address according to a memory-naming scheme. Ordinarily, the memory is organized in pages having some selected page size, and each page is assigned a page frame number (PFN). To access the physical memory, the OS and hardware work together to translate virtual memory addresses known by processes into physical memory addresses so that data will be stored in a known physical location and thus desired data stored in the memory can be retrieved.

Computer system 100 has multiple processors and may have a plurality of threads running concurrently in each or some of the processors. Each thread is assigned space in the memory as it is aggregated throughout the system, and some threads may share physical memory with other threads. Furthermore, the OS kernel and each thread are each assigned stack space in the main memory. Stacks are a data structure used by the CPU to execute machine code of the kernel and other threads.

Figure 2:
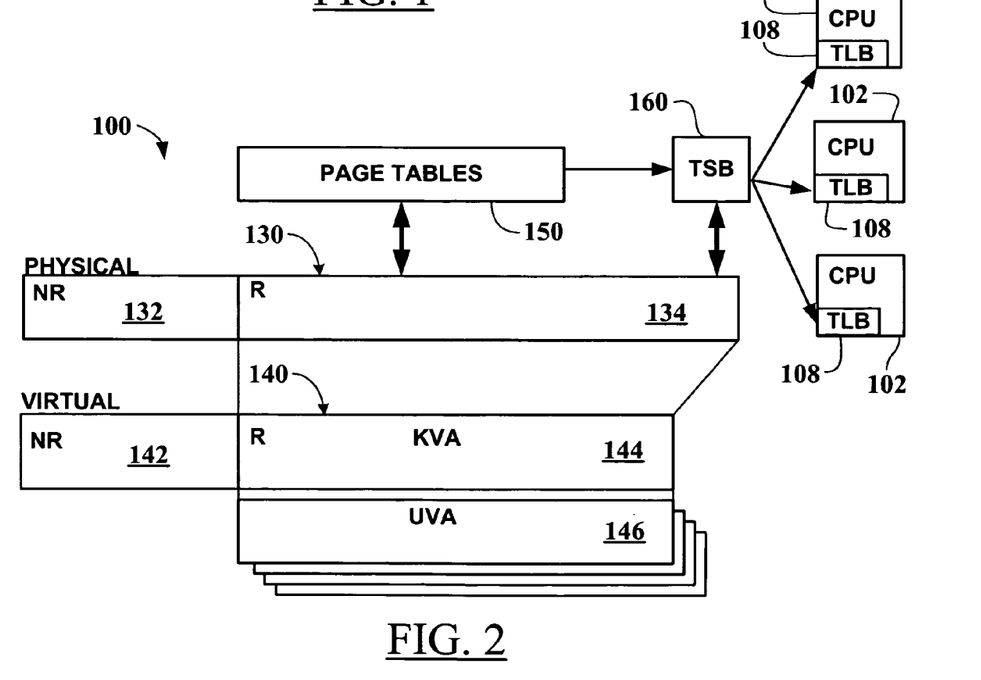
FIG. 2 shows another view of the exemplary computer system shown in FIG. 1.

FIG. 2 shows another representation of computer system 100. Specifically, computer system 100 includes CPUs 102, 104, 106, and physical memory 130 that is mapped to virtual memory 140 using a variety of means including translation lookaside buffers (TLB) 108, translation storage buffers (TSB) 160, and page tables 150. For example, CPU 102 may be running a thread that is assigned certain user virtual address (UVA) space 146. The thread may request data from a specific virtual address from the OS. The OS and hardware then, utilizing one or more of the local TLB 108, TSB 160, or page tables 150, will translate that virtual address given by the thread to a physical address, and retrieve the requested data from physical memory 130 at the specified physical address.

Previously, stacks have been stored in non-relocatable memory space 132 for the reasons discussed in the Background section above. Because of the nature of user and kernel stacks, moving memory pages containing stacks poses certain challenges.

Figure 3:
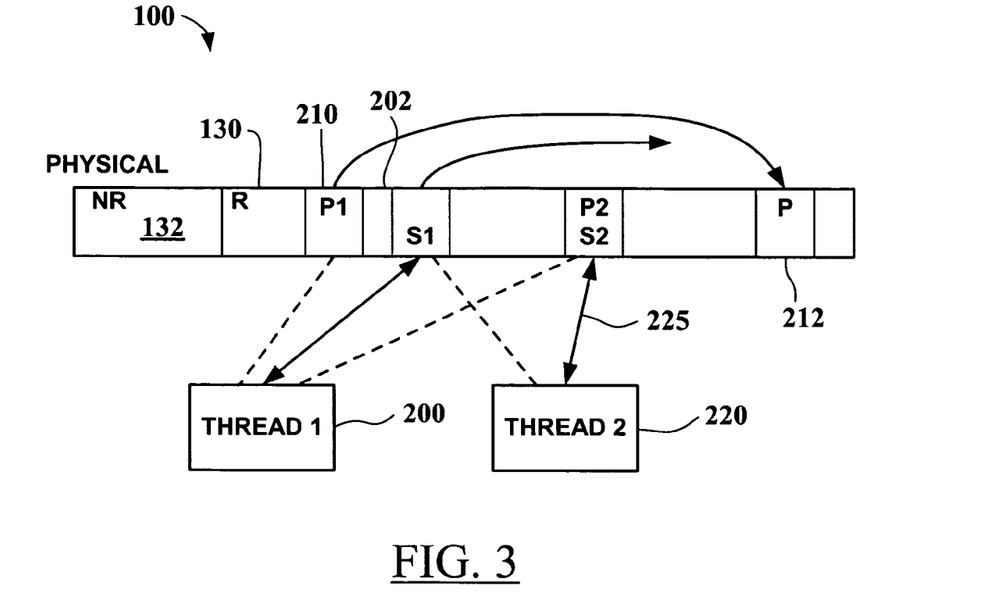
FIG. 3 shows a schematic representation of a memory page move operation.

One reason stack space is difficult to move is illustrated in FIG. 3. Physical memory 130 is shown here along with a first thread 200 and second thread 220. First thread 200 has stack space S1 stored in physical memory at page 202, and is tasked with moving data from a source page 210 to a destination page 212. If, at the same time as first thread 200 is carrying out this operation, a second thread attempts to move page 202 containing stack S1 to another location, a deadlock could result for first thread 200 since first thread 200 would be accessing its stack space while carrying out the move operation.

To prevent this situation from happening, first thread 200 prevents other threads such as second thread 220 from attempting to move pages on which first thread 200 has its stack space. This is accomplished according to one embodiment by first determining where its own stack is located in physical memory, and then acquiring a shared lock on those pages corresponding to its stack memory. A "shared lock" is a lock that allows other threads to read, but not modify data. This is contrasted with an "exclusive lock" that prevents other threads from accessing or modifying the memory.

The shared lock is set in the a page structure (not shown) which describes each physical page. The page structure includes the identity of the page (e.g., file and offset); lock status (shared lock, exclusive lock, or not locked); free status which indicates whether the page is free or not; and mapping, including a pointer to the TTE for the page. Acquisition of an exclusive lock is necessary to free a page or to destroy its identity. Since relocation involves freeing the source page, an exclusive lock on the source page needs to be acquired before it can be relocated.

If the shared lock cannot be acquired, e.g., if a page containing the first thread's stack space is being accessed by other threads, it could give up and try again at a later time. Alternatively, if the system or its administrator deems the relocation to be a priority, it could block future threads from accessing the page and wait for the shared lock to become available. For example, if a memory board is developing errors, it may be more important to relocate the data than to keep system performance at an optimum level, in order to prevent downtime and possible data corruption which could result from memory failure. A block is obtained by setting a bit in the page structure indicating a lock is requested; this prevents other threads from initiating any access to the memory.

Once the shared lock is acquired for all the memory pages containing the thread's stack space, a system memory relocation algorithm is applied as described below with reference to FIG. 7. The system memory relocation algorithm moves the memory from the source location to the destination location. After the relocation algorithm is completed, the shared lock is released.

Figure 4:
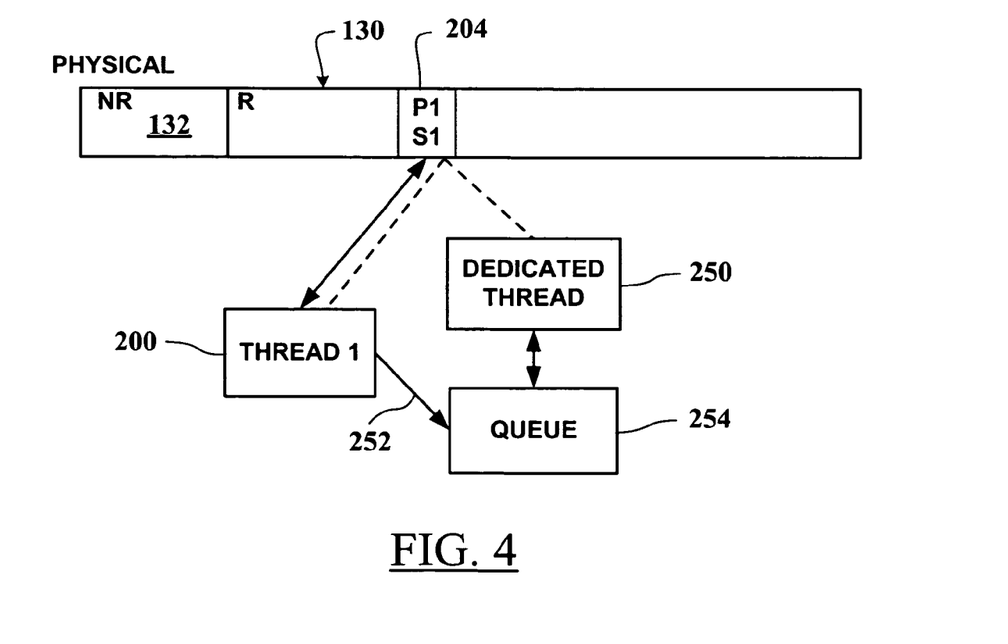
FIG. 4 shows another schematic representation of a memory page move operation.

FIG. 4 shows a second scenario in which first thread 200 attempts to move page 204 containing its own stack S1 from a first physical location to a second physical location. This can happen for various reasons. For example, referring to FIG. 1, suppose a CPU and memory exist on board 110 located at a first location and a thread T1 (not shown in FIG. 1) is started on board 110. For efficiency purposes, stack space S1 (not shown in FIG. 1) is also assigned in memory on board 110. This keeps stack space close to the processor that will be accessing it. Then, for some reason thread T1 is migrated to a CPU on board 118, which may be remote from board 110. For example, suppose the thread required significant access time to a device or resource available only at the remote location. In this case, to reduce traffic on bus 120, and latency, the thread is migrated to a new processor on board 118. However, stack S1 is still located on board 110, but first thread cannot move its stack because it would need the use of the stack to move the stack.

Referring back to FIG. 4, when the thread 200 performing relocation is relocating memory containing its own stack 204, it will, according to one embodiment, hand off the relocation task to a dedicated thread 250, which will then carry out the task of relocating the data on behalf of first thread 200.

A dedicated thread is a thread, sometimes referred to as a daemon or system service, that is launched during system boot and that runs in the background to carry out specific tasks. In the present case dedicated thread 250 is programmed to take over the task of moving data from a first location to a second location in physical memory according to a system memory relocation algorithm in response to requests placed in queue 254. Each item in queue 254 may include, e.g., a source page frame number and a destination page frame number, thereby defining the relocation task for dedicated thread 250. Dedicated thread 250 has its own stack allocated during system boot in the system's non-relocatable memory 132. Therefore, it will never be asked to move its own stack data.

First thread 200 may therefore "hand-off" the relocation task as shown by arrow 252 to dedicated thread 250. At this point, dedicated thread 250 is able to move the memory according to the system memory relocation algorithm described below with reference to FIG. 7. Upon completion of the relocation task, first thread 200 is notified by dedicated thread 250 of the successful completion of the task. Any known means of interprocess communication can be used for the notification that the relocation task is complete.

Figure 5:
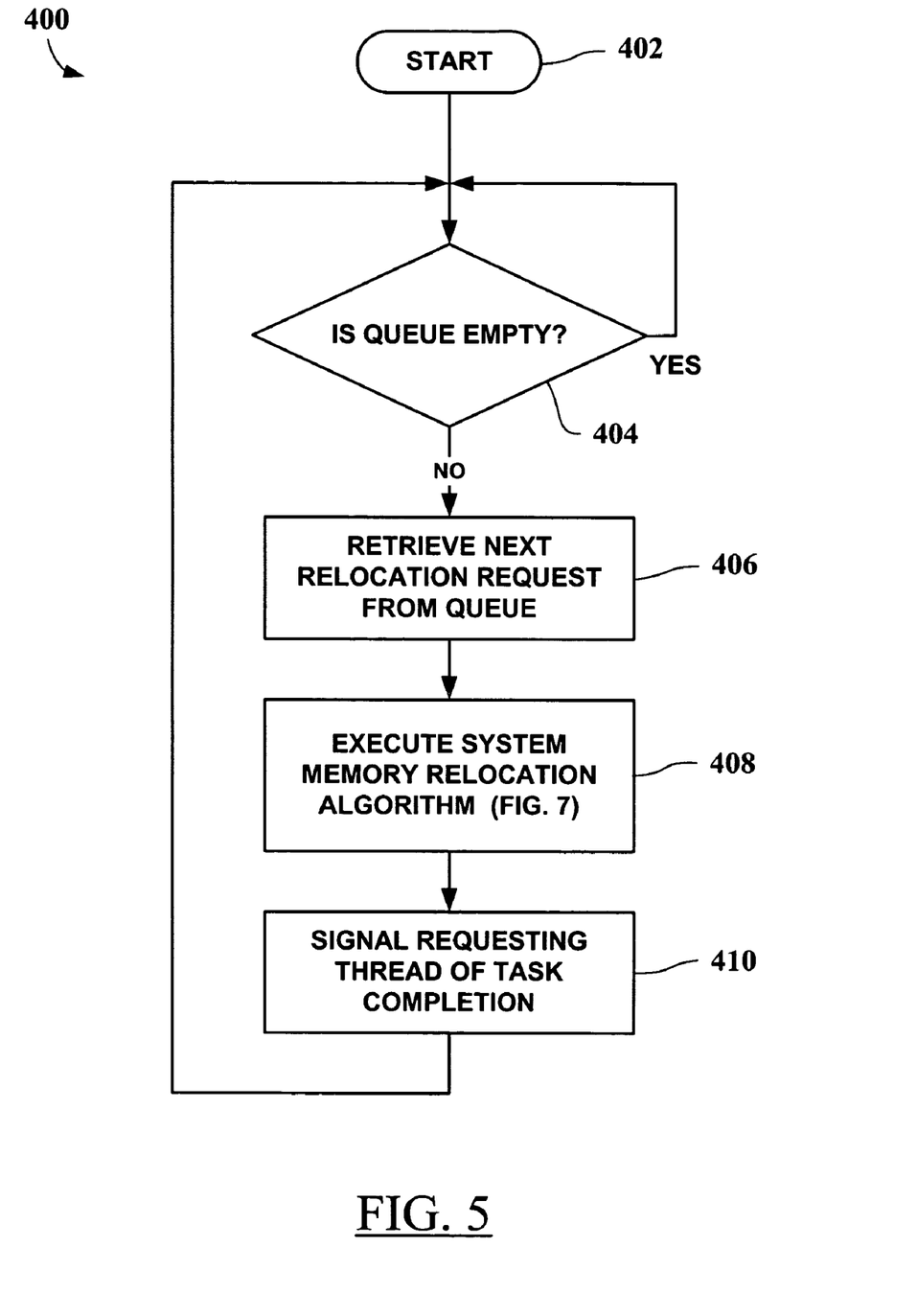
FIG. 5 shows a flow chart depicting an exemplary procedure for a dedicated thread.

An exemplary procedure followed by dedicated thread 250 is outlined in flowchart 400 in FIG. 5. Starting block 402 indicates the beginning of this procedure. In operation 404, the dedicated thread checks whether or not queue 254 is empty. If it is empty, it sleeps and is woken up when queue 254 is no longer empty. This is illustrated in flowchart 400 by an arrow extending back to the input of operation 404 for the case when queue 254 is empty. When the queue is not empty, the procedure flows to operation 406. Here, the next request is retrieved from queue 254. The procedure then flows to operation 408 wherein the system memory relocation algorithm is executed. The system memory relocation algorithm is discussed below with reference to FIG. 7. Next, the procedure flows to operation 410 wherein the requesting thread is notified as to the completion of the relocation request. The procedure then flows back to operation 404 to determine if queue 254 is now empty, and the procedure continues as described. Dedicated thread 250 therefore is always running in the background waiting to carry out the relocating task.

Figure 6:
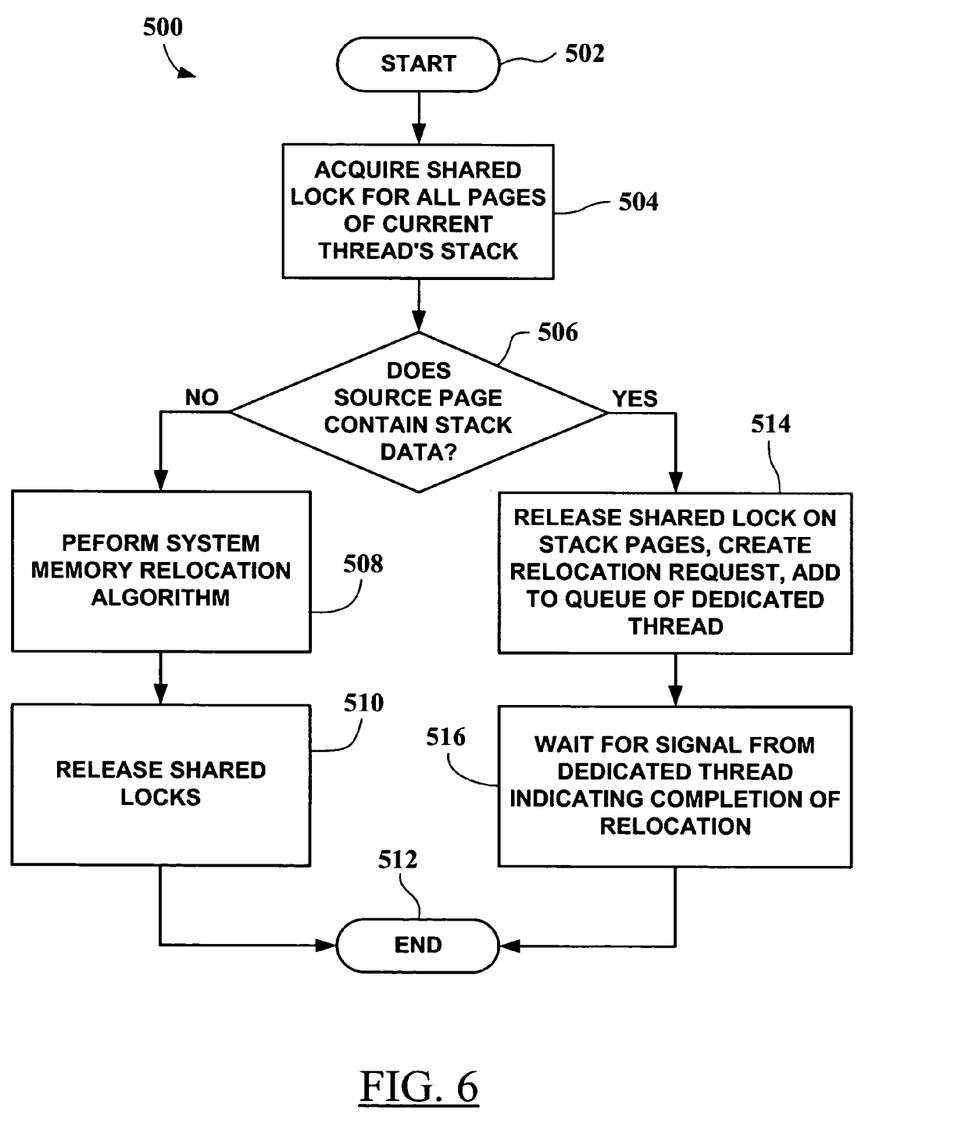
FIG. 6 shows a flow chart depicting an exemplary procedure for moving system memory.

FIG. 6 shows flow chart 500 depicting an exemplary page move procedure for moving system memory with movable stacks that resolves both of the issues described above. Starting block 502 indicates the beginning of the page move algorithm, and the procedure flows to operation 504 wherein a shared lock is acquired for all pages containing the current thread's stack. A single thread's stack may exist on multiple pages of memory. For example, a single stack may be assigned to three full pages of memory. The procedure next flows to operation 506 wherein it is determined whether the source page for copying data is one of the pages of the current thread's stack. If not, the procedure flows to operation 508 wherein the system memory relocation algorithm is executed. The system memory relocation algorithm is described below with reference to FIG. 7.

Upon completion of the system memory relocation algorithm operation 508, the procedure flows to procedure 510 wherein the shared locks are released, then to ending block 512 indicating the end of the procedure.

If, at operation 506, it was determined that the source page for copying does contain stack data of the current thread performing the move operation, the procedure flows to operation 514 wherein the shared lock acquired in operation 504 is released, a relocation request is created and added to queue 254 of dedicated thread 250 as described above with respect to FIGS. 4 and 5. The dedicated thread performs the system memory relocation algorithm and signals the requesting thread when it is done as described above with respect to FIG. 5. During this time, the requesting thread waits as indicated by operation 516. When the signal is received, the procedure flows to ending block 512 indicating the end of the page move procedure.

The stack of a thread could be relocated in the following contexts: First, the scheduler thread that is responsible for assigning CPU time to various threads may choose a thread to run on a particular CPU and perform the relocation algorithm to ensure that the thread's stack is adjacent to the assigned CPU. For example, this process could be performed upon dispatching the thread to the selected CPU. In this case, when a particular thread X's priority indicates that it is next in line for CPU time, the scheduler thread will dispatch thread X to a CPU using a dispatch procedure or separate dispatch thread. Note that there is no need to allocate stacks of scheduler and other kernel threads on non-relocatable memory. According to one embodiment, their stacks could be allocated on relocatable memory. The stack of the dedicated thread 250 (FIG. 4) however is allocated on the non-relocatable memory. All other stacks could be allocated on relocatable memory. Second, a particular thread may decide to relocate its own stack while handling page fault. A page fault will occur when a physical page is missing or swapped to a mass-storage device, or when the thread is blocked from accessing the physical page. Third, a thread may decide to relocate its own stack while handling a system call.

Note that if a scheduler thread tries to relocate the stack of another thread while dispatching that thread onto a CPU, the stack relocation algorithm may be applied irrespective of whether the stack of scheduler thread is non-relocatable or not. In this case, it won't be enqueueing the relocation request to dedicated thread 250 but the scheduler will be relocating the stack itself.

Figure 7:
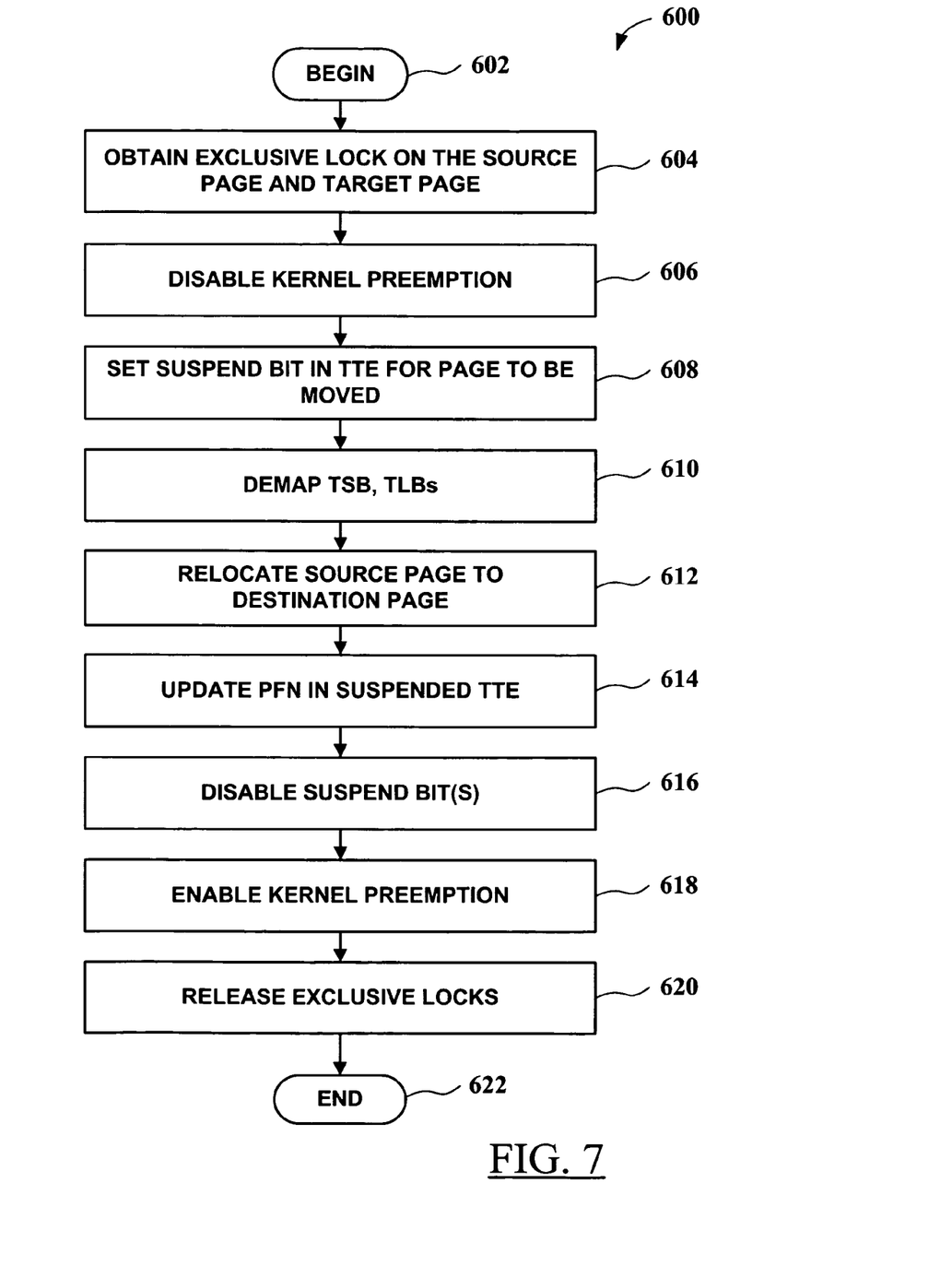
FIG. 7 shows a flow chart depicting an exemplary system memory relocation algorithm.

FIG. 7 shows a flow chart 600 depicting an exemplary procedure for carrying out a system memory relocation algorithm. More detail regarding this algorithm is provided in related U.S. patent application Ser. No. 10/798,742 cited above and incorporated herein by reference. The algorithm begins as indicated by starting block 602 and flows to operation 604. At operation 604, the thread performing the algorithm obtains an exclusive lock on the source and destination pages via the page control table (not shown). The page control table is a known mechanism associated with the page tables 150 (FIG. 1) for controlling access to the memory. More information on the page control table is provided in the related U.S. Patent application cited above and incorporated herein by reference.

Once the exclusive lock on the source and destination pages is acquired, the procedure flows to operation 606 wherein kernel preemption is disabled to prevent interruption of the system memory relocation. Kernel preemption can be disabled, for example, by raising the kernel priority interrupt level. This prevents the CPU performing the relocation from being paused by another CPU, and also prevents a device interrupt from preempting the thread and possibly touching the page being relocated, which could result in a deadlock.

After disabling kernel preemption, the procedure flows to operation 608 wherein the suspend bit in the translation table entry (TTE) in page tables 150 for the page to be moved is set. This prevents access by other threads to the physical page containing data being moved. Because the TTE is changed, copies of this TTE contained in the TSB 160 and TLBs 108 are now stale. Therefore, the procedure then flows to operation 610 wherein the TSB 160 and TLBs 108 are demapped, thereby removing the stale TTEs. It is also possible to update the TTEs rather than demapping them. In yet another embodiment, all TLBs are flushed by, e.g., invalidating all current TTEs therein.

The procedure then flows to operation 612, wherein the data from the source page is copied to the destination page in physical memory. The procedure then flows to operation 614 wherein the TTE suspended in operation 610 is updated with the new page frame number of the destination page. Next, in operation 616, the suspend bit that was set in operation 608 is disabled. Next, in operation 618 kernel preemption is re-enabled, by, e.g., dropping the priority interrupt level that was raised in operation 608. Next, in operation 620, the exclusive locks acquired in operation 604 are released. The procedure then ends as indicated by ending block 622.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

Embodiments of the present invention can be processed on a single computer, or using multiple computers or computer components which are interconnected. A computer, as used herein, shall include a standalone computer system having its own processor, its own memory, and its own storage, or a networked terminal. In some distributed computing systems, users of a computer system may actually be accessing component parts that are shared among a number of users. The users can therefore access a virtual computer over a network, which will appear to the user as a single computer customized and dedicated for a single user.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be stored on network-coupled computer system so that the computer readable code is accessed and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for relocating data stored in a source page in physical memory to a destination page, the method comprising:
    assigning stack space for a relocation thread in relocatable memory space;
    assessing whether the source page contains stack data of the relocation thread;
    when the source page contains stack data of the relocation thread,
        obtaining an exclusive lock on the source page and the destination page;
        disabling preemption of a kernel, wherein the kernel was preemptive prior to the disabling;
        creating a relocation request to move said data;
        adding said relocation request to a queue of a dedicated thread, wherein said creating and said adding is carried out by the relocation thread which is distinct from said dedicated thread;
        performing system memory relocation using the dedicated thread;
        re-enabling preemption of said kernel; and
        releasing said exclusive lock.

2. The method of claim 1, wherein said relocation request includes a source page frame number and a destination page frame number.

3. The method of claim 1, wherein said dedicated thread is created during system boot.

4. The method of claim 1, wherein said dedicated thread locates its stack in non-relocatable memory.

5. The method of claim 1 wherein said relocation thread is one of a user thread and a kernel thread.

6. The method of claim 1, wherein disabling of kernel preemption further includes raising kernel priority interrupt level so as to prevent interruption of the system memory relocation.

7. A method to be performed by a relocation thread for relocating data stored in a source page in physical memory to a destination page, the method comprising:
    assigning stack space for said relocation thread in relocatable memory space;
    assessing whether the source page contains stack data of the relocation thread;
    when said source page does not contain stack data of the relocation thread, obtaining an exclusive lock on said source page and said destination page;
        disabling preemption of a kernel, wherein the kernel was preemptive prior to the disabling; and
        performing system memory relocation using relocation thread.

8. The method of claim 7, further comprising creating a relocation request and adding said relocation request to a queue of a dedicated thread when said source page contains stack data of the relocation thread, wherein said dedicated thread is created during system boot.

9. The method of claim 8, wherein said relocation request includes a source page frame number and a destination page frame number.

10. The method of claim 7, wherein disabling of kernel preemption further includes raising kernel priority interrupt level so as to prevent interruption of the system memory relocation.

11. The method of claim 7, further comprising:
    acquiring a shared lock for all pages containing stack data of the relocation thread.

12. The method of claim 11, further comprising releasing said shared lock for all pages containing said stack data, creating a relocation request, and adding said relocation request to a queue of a dedicated thread when said source page contains stack data of the relocation thread, said dedicated thread being created during system boot.

13. The method of claim 7, wherein said performing comprises:
    suspending access to said source page;
    invalidating translation lookaside buffer entries affected by said performing;
    copying said data from said source page to said destination page;
    modifying a translation table entry referencing said source page in a page table so that it now references said destination page;
    disabling suspension of said source page;
    re-enabling preemption of the kernel; and
    releasing said exclusive lock.

14. The method of claim 13, wherein said suspending and said disabling suspension comprise setting and restoring a suspend bit in said translation table entry.

15. A computer readable medium including instructions encoded therein for performing a method, the method providing a system call for a relocation thread for relocating data stored in a source page in physical memory to a target page in physical memory, said system call comprising:

determining whether said source page contains stack data of the relocation thread;

obtaining an exclusive lock on said source page and said target page;

disabling preemption of a kernel, wherein the kernel was preemptive prior to the disabling;

when said source page does not contain said stack data of the relocation thread,         performing a system memory relocation algorithm; and     when said source page contains said stack data of the relocation thread,         creating a relocation request and adding said relocation request to a queue of a dedicated thread, said dedicated thread performing said system memory relocation algorithm in response to said adding.

16. The computer readable medium of claim 15, wherein the system call further comprises:

acquiring a shared lock for all pages containing said stack data of said relocation thread prior to said performing, said method further comprising releasing said shared lock after said performing.

17. The computer readable medium of claim 15, wherein the system call further comprises, after said creating and said adding, receiving a signal from said dedicated thread that said performing by said dedicated thread is complete.

18. The computer readable medium of claim 15 wherein said relocation thread is one of a user thread or a kernel thread.

19. The computer readable medium of claim 15 wherein disabling of kernel preemption further includes raising kernel priority interrupt level so as to prevent interruption of the system memory relocation.

20. The computer readable medium of claim 15, wherein said system memory relocation algorithm comprises:

suspending access to said source page;

invalidating translation lookaside buffer entries affected by said performing;

copying said data from said source page to said target page;

modifying a translation table entry referencing said source page in a page table so that it now references said target page;

disabling suspension of said source page;

re-enabling preemption of said kernel; and releasing said exclusive lock.

\* \* \* \* \*